(12) United States Patent
Hong et al.

(10) Patent No.: US 9,391,479 B2
(45) Date of Patent: Jul. 12, 2016

(54) SPOKE TYPE PERMANENT MAGNET MOTOR CAPABLE OF MINIMIZING LEAKAGE OF MAGNETIC FLUX

(75) Inventors: Jung-Pyo Hong, Seoul (KR); Sung-Il Kim, Gyeongsangnam-do (KR)

(73) Assignee: INDUSTRY-UNIVERSITY COOPERATION FOUNDATION HANYANG UNIVERSITY, Seoul (KR)

( * ) Notice: Subject to any disclaimer, the term of this patent is extended or adjusted under 35 U.S.C. 154(b) by 335 days.

(21) Appl. No.: 14/008,336

(22) PCT Filed: Mar. 26, 2012

(86) PCT No.: PCT/KR2012/002171
§ 371 (c)(1),
(2), (4) Date: Sep. 27, 2013

(87) PCT Pub. No.: WO2012/134130
PCT Pub. Date: Oct. 4, 2012

(65) Prior Publication Data
US 2014/0021819 A1 Jan. 23, 2014

(30) Foreign Application Priority Data
Mar. 29, 2011 (KR) .......................... 10-2011-0028028

(51) Int. Cl.
*H02K 1/27* (2006.01)
*H02K 1/28* (2006.01)

(52) U.S. Cl.
CPC .. *H02K 1/28* (2013.01); *H02K 1/27* (2013.01); *H02K 1/2786* (2013.01)

(58) Field of Classification Search
CPC ........... H02K 1/28; H02K 1/27; H02K 1/272; H02K 1/274; H02K 1/276; H02K 1/2773
USPC ............ 310/156.22, 156.12, 156.13, 156.14, 310/156.43, 156.48, 156.55, 156.56, 310/156.59, 156.61
See application file for complete search history.

(56) References Cited

U.S. PATENT DOCUMENTS

| 5,091,668 | A | * | 2/1992 | Cuenot | ................ | H02K 1/2773 310/156.61 |
| 5,378,953 | A | * | 1/1995 | Uchida | ................ | H02K 1/2773 310/156.59 |
| 2010/0277017 | A1 | * | 11/2010 | Alexander | ........... | H02K 1/2773 310/156.51 |

FOREIGN PATENT DOCUMENTS

KR    10-0548716 B1    4/2005

* cited by examiner

*Primary Examiner* — Michael Andrews
(74) *Attorney, Agent, or Firm* — Ladas & Parry LLP

(57) ABSTRACT

A spoke type permanent magnet motor according to the present invention includes a stator having a stator slot radially disposed according to the center thereof and a stator core radially formed between the stator slots; a spoke type rotor, provided inside or outside the stator, having a rotor core radially disposed in the same direction as the stator slot and stator core and a permanent magnet radially disposed between the rotor core; a first fastening member, made of non-magnetic material, provided at the top and bottom of the rotor, respectively, in the height direction of the rotor; and a second fastening member, made of non-magnetic material, provided to penetrate the rotor core and first fastening member, thereby to maintain high output density and to easily implement miniaturization.

16 Claims, 20 Drawing Sheets

SPOKE TYPE PERMANENT MAGNET MOTOR CAPABLE OF MINIMIZING LEAKAGE OF MAGNETIC FLUX

BACKGROUND OF THE INVENTION

1. Field of the Invention

The present invention relates to a spoke type permanent magnet motor, and more particularly, to a permanent magnet motor of an outer rotor type formed in a multipolar spoke type.

2. Description of the Related Art

As enclosed in Korean Examined Patent Publication 10-548716, a spoke type motor, as shown in FIG. 1, includes a rotor 1 having a number of permanent magnets 3, and a stator 2 having a number of slots 2a wound with coils and enclosing the outside of the rotor 1.

The permanent magnet 3 of the rotor 1 is radially disposed on a rotation shaft (not shown). The rotor 1 supports the permanent magnet 3 and includes a cylindrical core 4 forming paths of magnetic flux. The core 4 is formed with a number of steel plates laminated in an axis direction and includes a number of magnet coupling holes 4a for coupling a number of permanent magnets 3. Further, the core 4 includes a supporting section 4b for supporting the magnets 3 at an inner circumference section near the rotation shaft. The core 4 is integrally connected by the supporting section 4b.

However, the rotor of the motor shown in FIG. 1 causes magnetic flux leakage through the supporting section 4b because the inner circumference section of the core near the rotation shaft is connected by the supporting section 4b. That is, there is the magnetic flux leakage because magnetic flux is flowed through magnetic material, that is, the supporting section 4b. The size of the magnet 3 or the amount of the magnet is increased in consideration of such a magnetic flux leakage in a prior art, but, in this case, the bulk of the rotor 1 is increased and manufacturing cost is increased. Particularly, in order to achieve high efficiency, expensive neodymium magnet is used, wherein the neodymium magnet is expensive, thereby to increase manufacturing cost.

Further, the spoke type motor has an advantage capable of increasing the output density by small amount of the permanent magnet, but the demagnetization phenomenon of the permanent magnet is easily generated as compared with different type of the permanent magnet motor.

SUMMARY OF THE INVENTION

The present invention provides a spoke type permanent magnet motor using an inner stator and an outer rotor of spoke type.

The present invention provides the spoke type permanent magnet motor having high output density by disposing the spoke type permanent magnet in the outer rotor.

The present invention provides the spoke type permanent magnet motor capable of reducing the generating of the demagnetization for the permanent magnet by inserting magnetic material into the permanent magnet.

The present invention may achieve the miniaturization of the motor due to high output density and provides the spoke type permanent magnet motor capable of replacing with ferrite permanent magnet while maintaining the same size and performance as the motor using rare-earth permanent magnet.

The present invention provides the spoke type permanent magnet motor capable of increasing back EMF and minimizing leakage of magnetic flux.

The present invention provides the spoke type permanent magnet motor capable of generating reluctance torque and maximizing output torque using it.

The present invention provides the spoke type permanent magnet motor capable of generating the same output torque in spite of the reduction of the amount of the permanent magnet.

In order to solve the problems, a spoke type permanent magnet motor according to one embodiment of the present invention may include a stator having a stator slot radially disposed according to the center thereof and a stator core radially formed between the stator slots; a spoke type rotor, provided inside or outside the stator, having a rotor core radially disposed in the same direction as the stator slot and stator core and a permanent magnet radially disposed between the rotor cores; a first fastening member, made of non-magnetic material, provided at the top and bottom of the rotor, respectively, in the height direction of the rotor; and a second fastening member, made of non-magnetic material, provided to penetrate the rotor core and first fastening member.

With the configurations, the spoke type permanent magnet motor may implement miniaturization while maintain high output and may maintain the same size and performance as the motor using the rare-earth permanent magnet.

The permanent magnet is magnetized in the direction facing each other, thereby to form polarity for the rotor core between the permanent magnets.

The rotor core is formed in a division type so that one end of the rotor core is connected to a rotor housing provided at an outer surface of the rotor or is detached from the rotor housing provided at an outer surface of the rotor.

One end of the rotor core is formed with projections or grooves for connecting to the housing, and the housing connected with one end of the rotor core is formed with the grooves or projections corresponding to the grooves or projections of the rotor core.

The permanent magnet is pushed between the rotor cores, and is radially disposed along the radial direction of the inserting hole.

The length of the permanent magnet for the radial direction of the inserting hole is shorter than it of the rotor core.

On the other hand, the spoke type permanent magnet motor according to another embodiment of the present invention may include a stator having a stator slot radially disposed according to the center thereof and a stator core radially formed between the stator slots; and a spoke type rotor, provided inside or outside the stator, having a rotor core radially disposed in the same direction as the stator slot and stator core and a permanent magnet radially disposed between the rotor cores and formed shorter than the rotor core.

With the configurations, the reluctance torque is generated, thereby to prevent the lowering of the output even on using a small amount of the permanent magnet.

An interval between the rotor core and stator is shorter than it between the permanent magnet and the stator.

One end of the rotor core adjacent to the stator is protruded in the width direction of the permanent magnet.

The width of the middle part of the rotor core is larger than it of the middle part of the stator core.

The ratio of the width of the middle part of the rotor core to the width of the middle part of the stator core is 1.5 to 2.

The spoke type permanent magnet motor further includes a rotor housing formed in the rotor and connected with one end of the rotor core, wherein the housing may be coupled with the rotor core by a first fastening member, made of the non-magnetic material, provided at the top and bottom thereof, respectively, along the height direction of the rotor and a second fastening member, made of the non-magnetic material, provided to penetrate the rotor core and the first fastening member.

The spoke type permanent magnet motor further includes a demagnetization preventing member integrally formed with the permanent magnet or detachably formed from the permanent magnet.

The demagnetization preventing member may be made of magnetic material to be inserted into the permanent magnet.

The demagnetization preventing member blocks magnetic flux flowing through the permanent magnet, and the magnetic flux is formed through the demagnetization preventing member.

The housing is made of the non-magnetic material, and the permanent magnet is ferrite series, thereby to implement the motor having high efficiency even on using an inexpensive ferrite series magnet.

DETAILED DESCRIPTION OF THE PREFERRED EMBODIMENT

Figure 1:
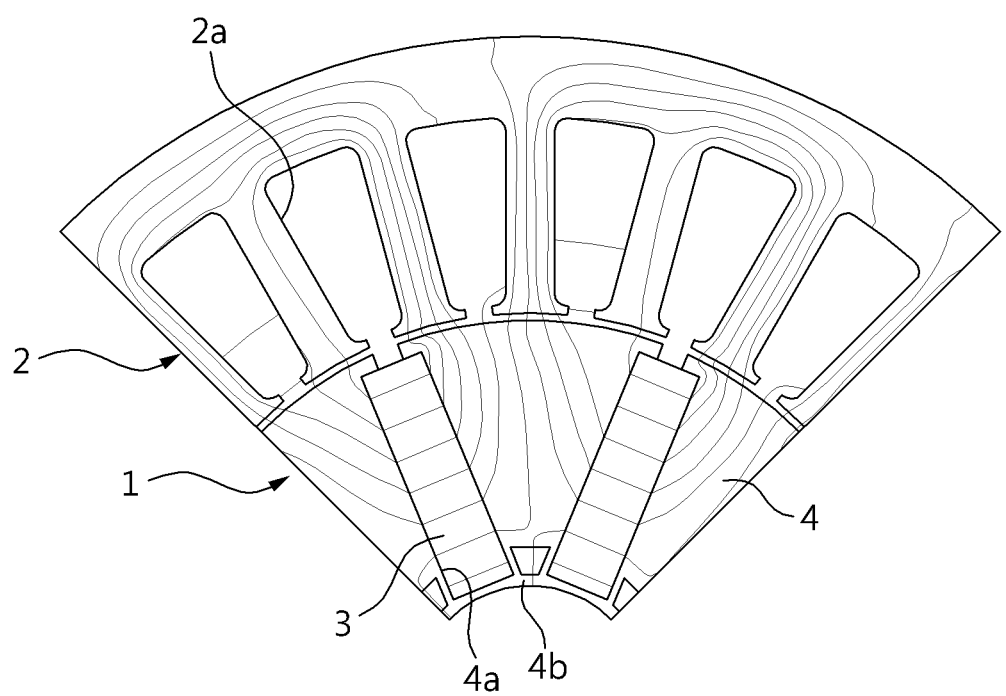
FIG. 1 is a cross-sectional view for a portion of a motor according to a prior art.

Hereinafter, embodiments of the present invention will be described in detail with reference to the accompanying drawings. Therefore, the present invention is not limited to the embodiments. Like reference numerals refer to like elements.

Figure 2:
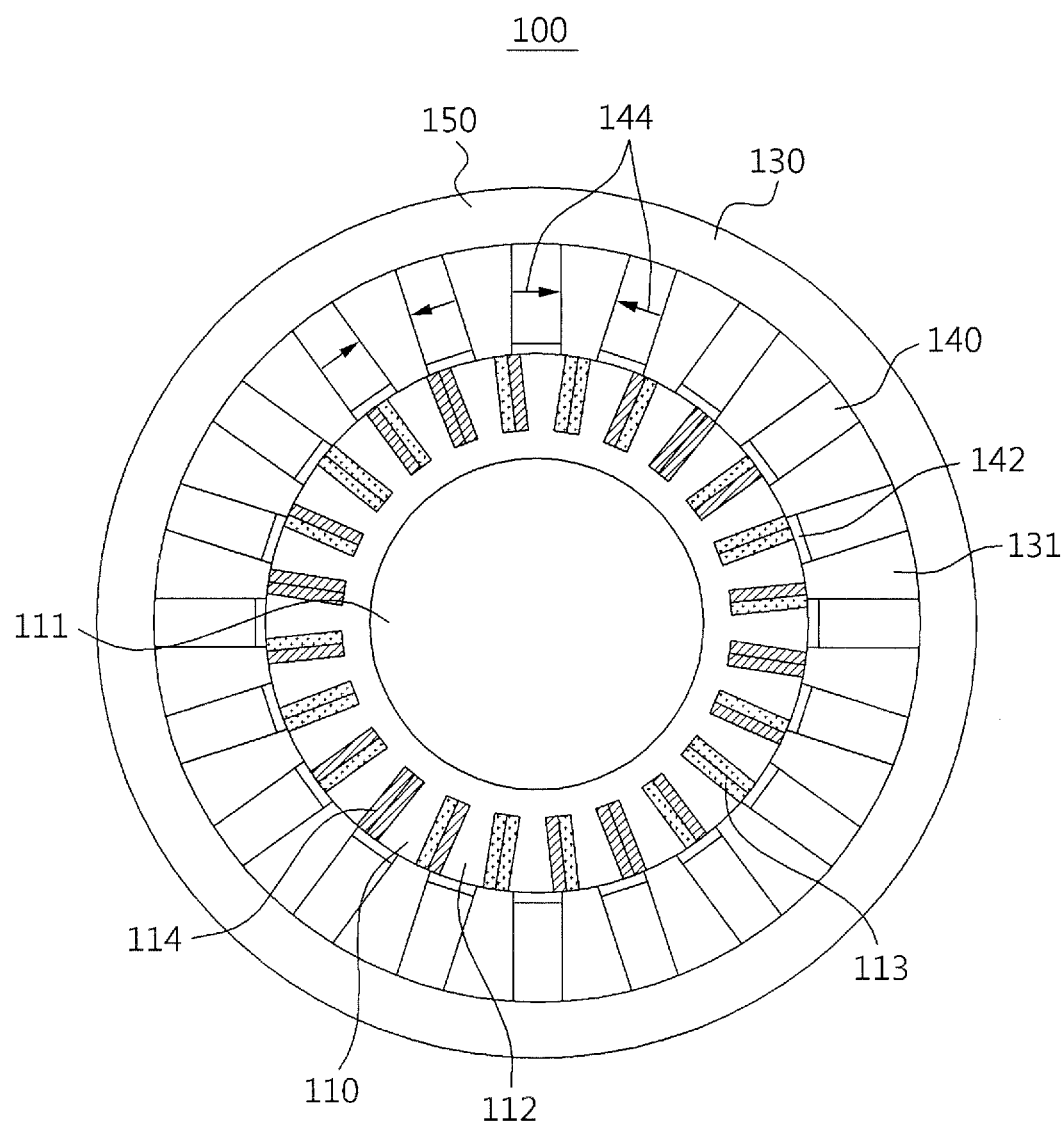
FIG. 2 is a view for schematically showing a spoke type permanent magnet motor according to one embodiment of the present invention.
Figure 3:
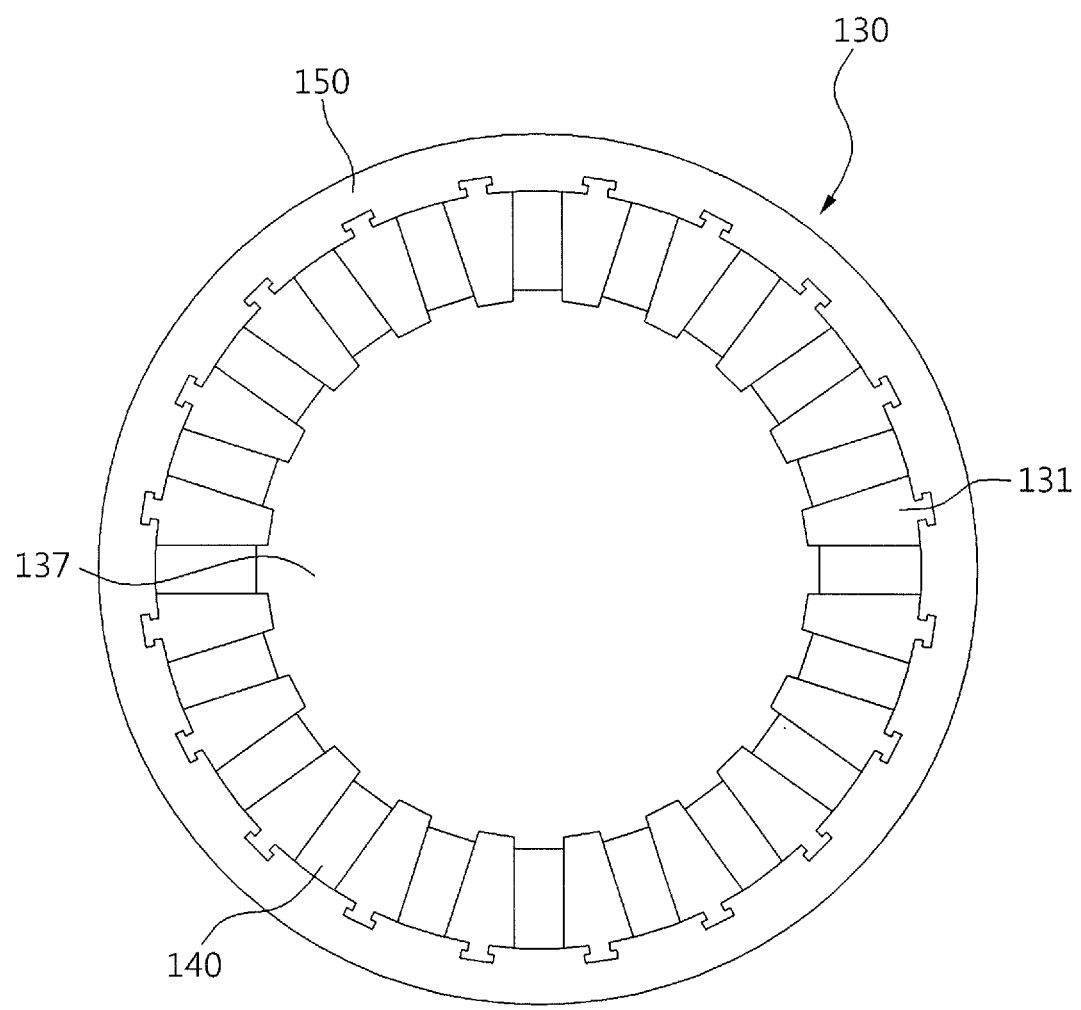
FIG. 3 is a view for showing an outer rotor of the spoke type permanent magnet motor shown in FIG. 2.
Figure 4:
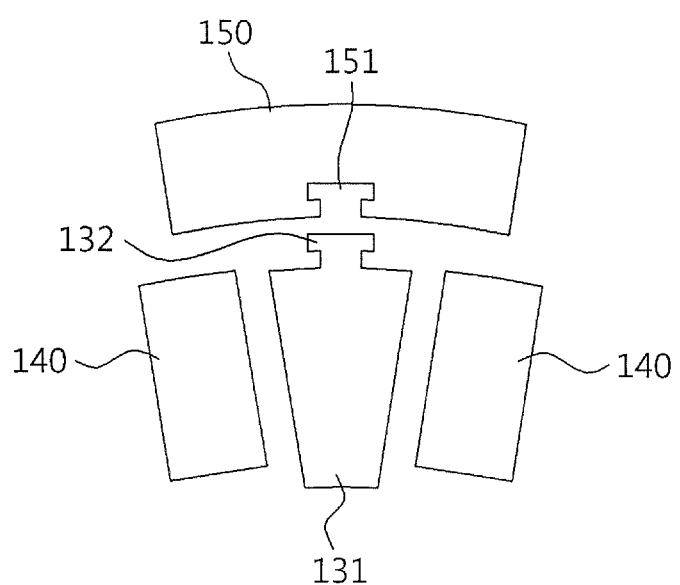
FIG. 4 is a view for showing a connecting structure between a rotor housing and rotor core in the outer rotor according to FIG. 3.
Figure 5:
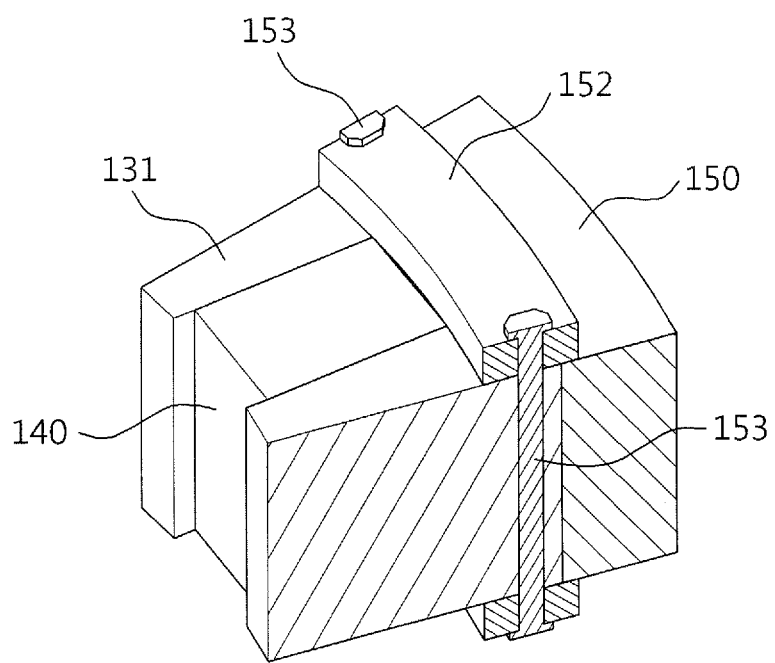
FIG. 5 is a view for showing variations for a connecting structure between a rotor housing and rotor core in the outer rotor according to FIG. 3.
Figure 6A:
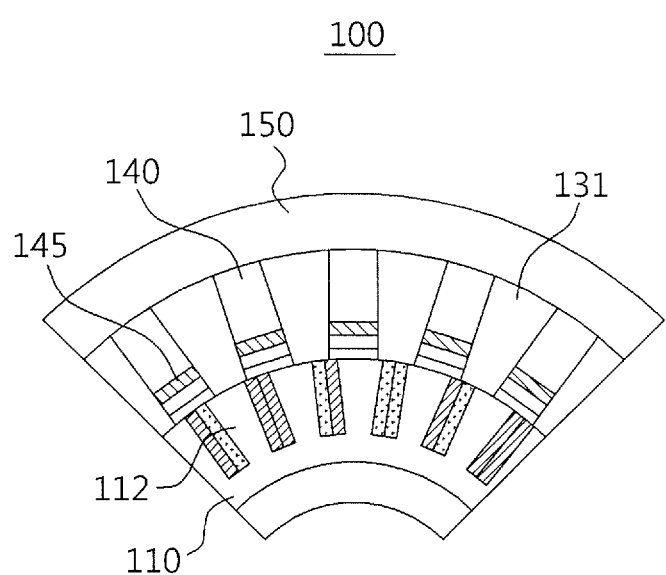
FIGS. 6A and 6B are views for showing permanent magnets formed with a demagnetization preventing member in the outer rotor according to FIG. 3.
Figure 6B:
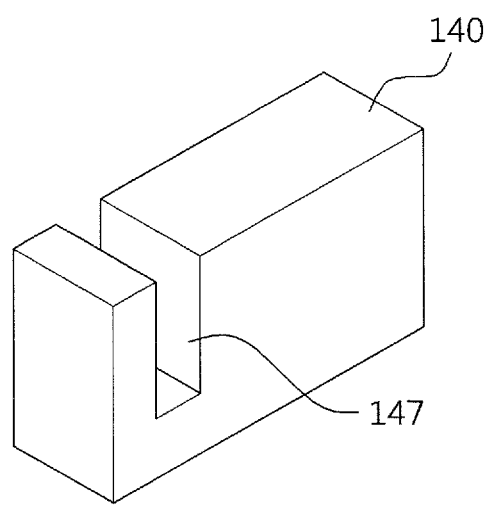
Figure 7:
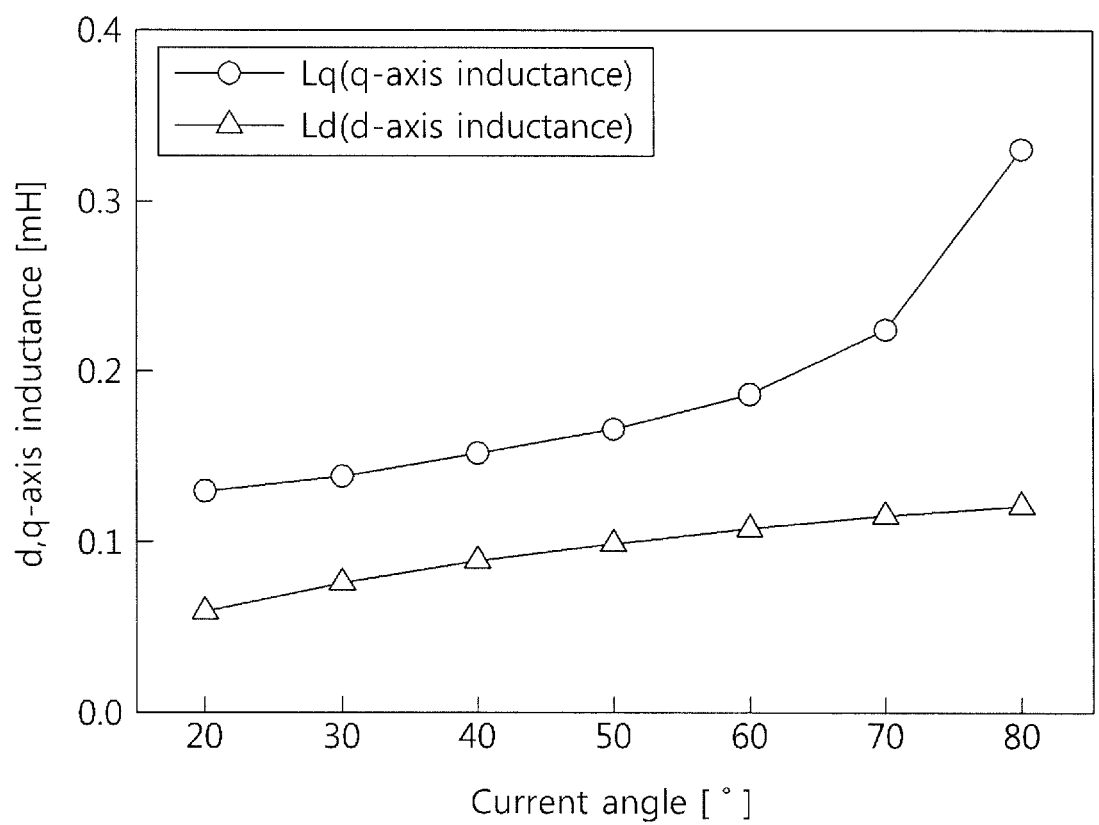
FIG. 7 is a graph for representing a d-axis inductance and a q-axis inductance according to one embodiment of the present invention.
Figure 8:
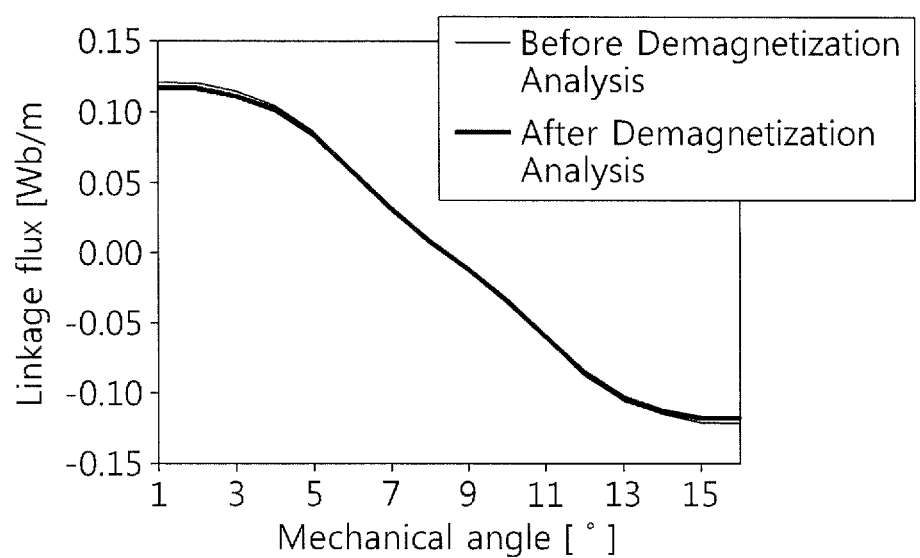
FIG. 8 to FIG. 10 are graphs for comparing linkage magnetic flux in case of not inserting the demagnetization preventing member and in case of inserting the demagnetization preventing member into the permanent magnets according to FIG. 6.
Figure 9:
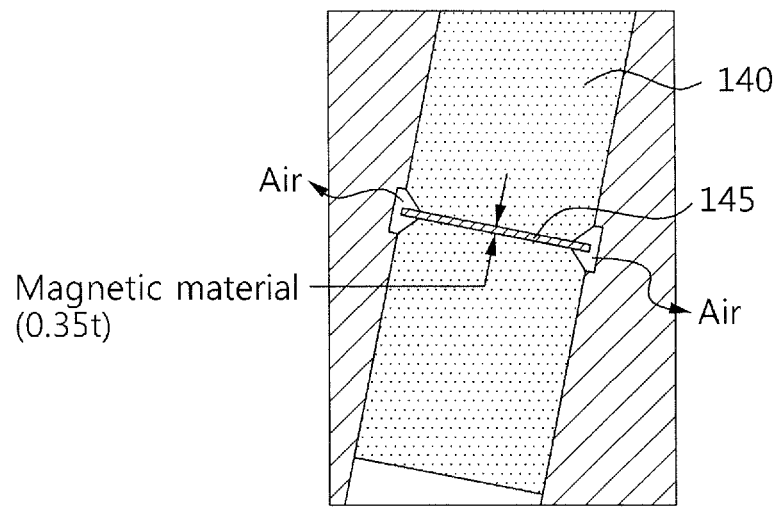
Figure 9:
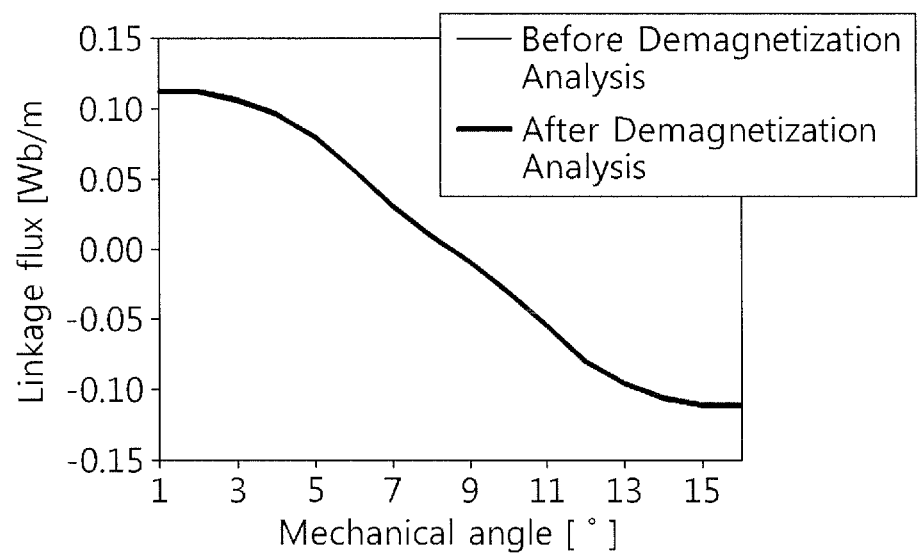
Figure 10:
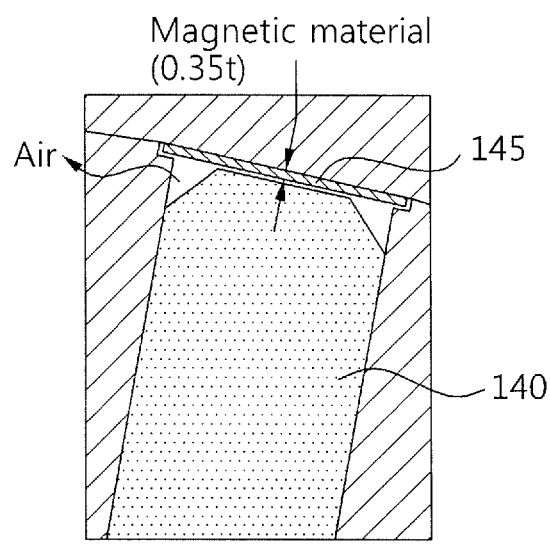
Figure 10:
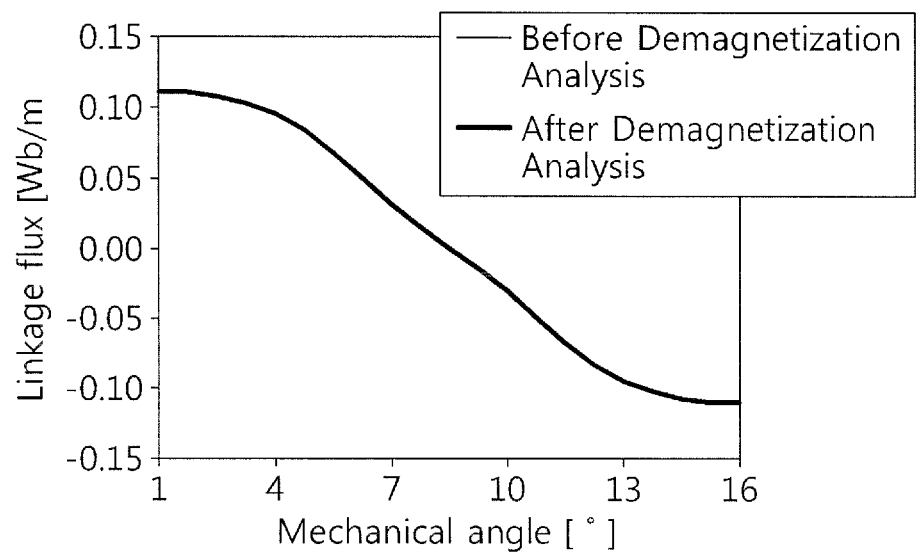
Figure 11:
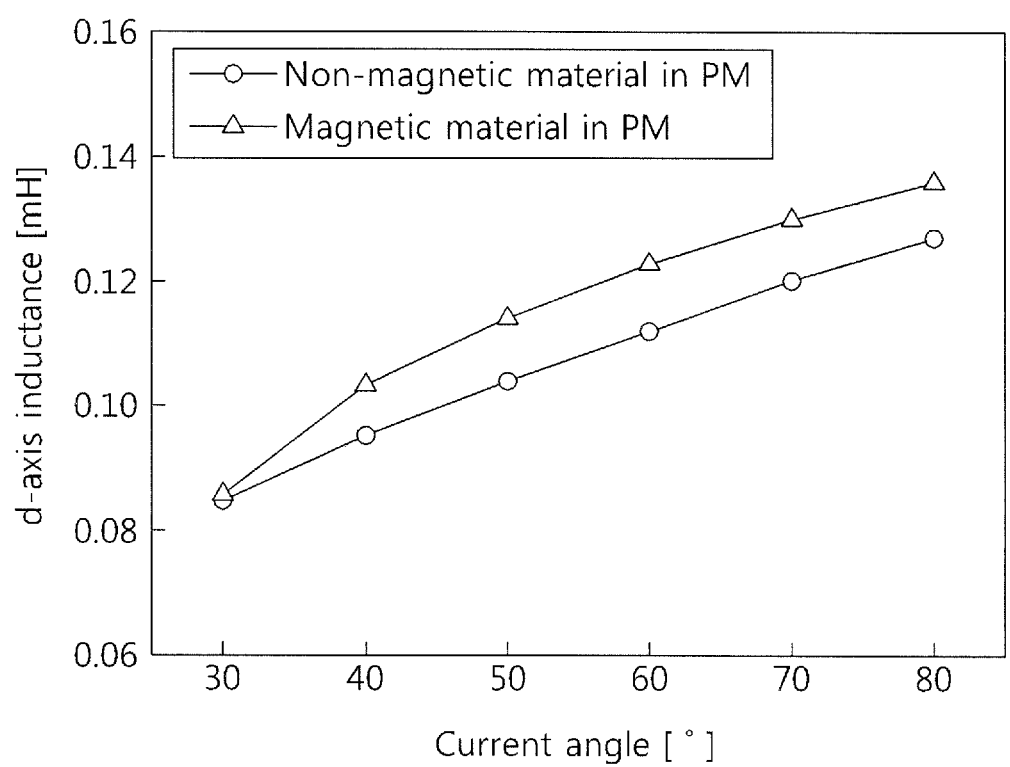
FIG. 11 is a graph for comparing the d-axis inductances in case of not inserting the demagnetization preventing member and in case of inserting the demagnetization preventing member into the permanent magnet according to FIG. 6.
Figure 12A:
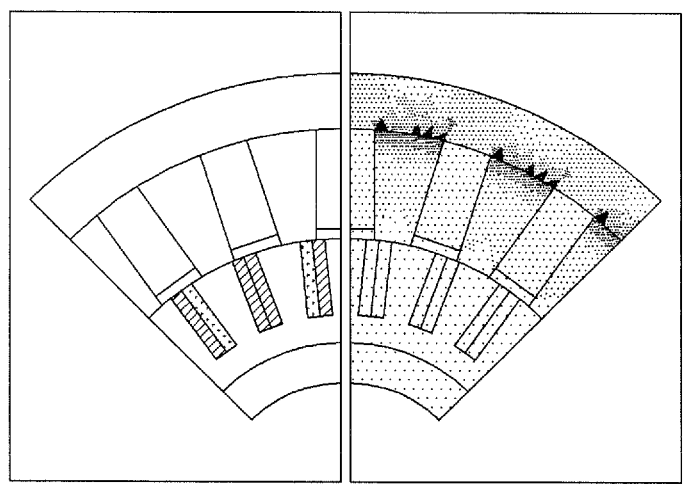
FIGS. 12A and 12B are graphs for showing a magnetic flux density and a back EMF in the case that a housing of the outer rotor of the spoke type permanent magnet motor according to one embodiment of the present invention is magnetic material.
Figure 12B:
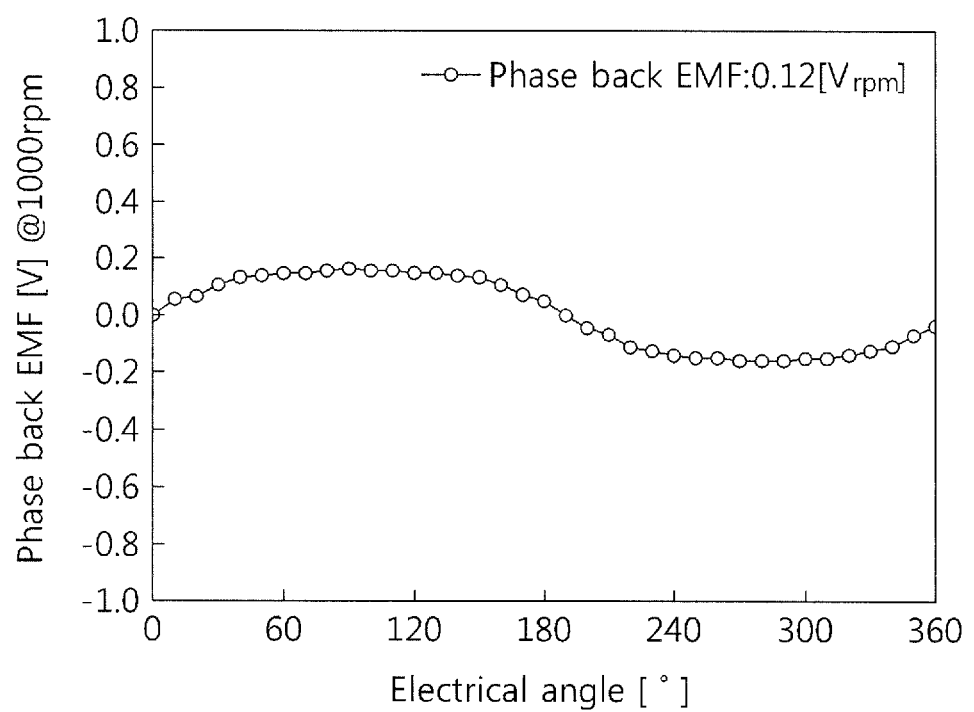
Figure 13A:
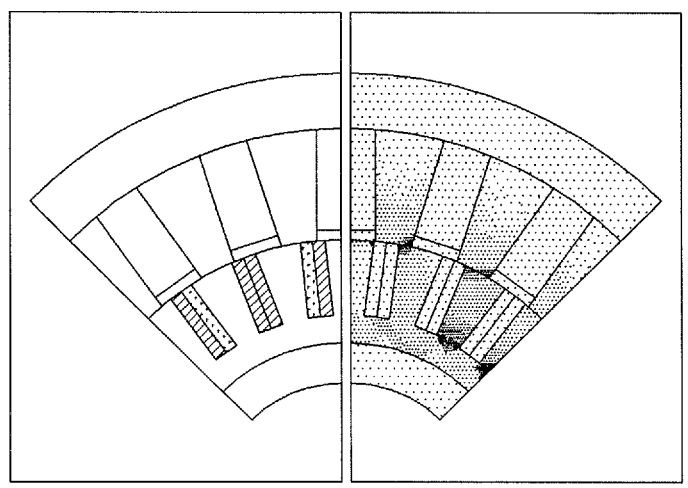
FIGS. 13A and 13B are graphs for showing the magnetic flux density and the back EMF in the case that the housing of the outer rotor of the spoke type permanent magnet motor according to one embodiment of the present invention is non-magnetic material.
Figure 13B:
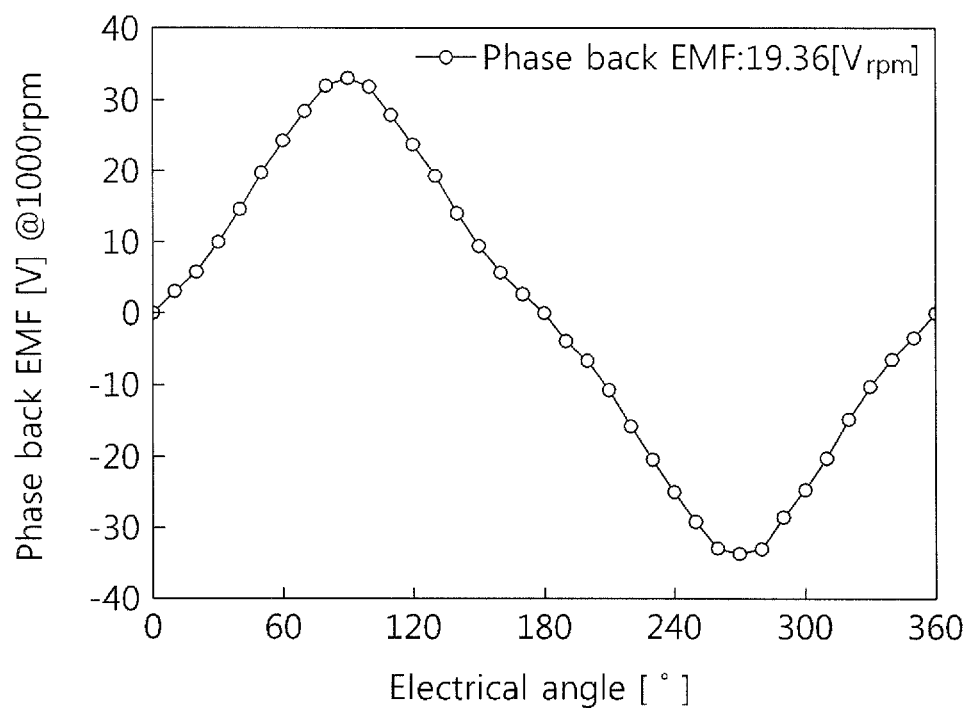

FIG. 2 is a view for schematically showing a spoke type permanent magnet motor according to one embodiment of the present invention, FIG. 3 is a view for showing an outer rotor of the spoke type permanent magnet motor shown in FIG. 2, FIG. 4 is a view for showing a connecting structure between a rotor housing and rotor core in the outer rotor according to FIG. 3, FIG. 5 is a view for showing variations for the connecting structure between a rotor housing and rotor core in the outer rotor according to FIG. 3, FIGS. 6A and 6B are views for showing a permanent magnet formed with a demagnetization preventing member in the outer rotor according to FIG. 3, FIG. 7 is a graph for representing a d-axis inductance and a q-axis inductance according to one embodiment of the present invention, FIG. 8 to FIG. 10 are a graph for comparing linkage magnetic fluxes in case of not inserting the demagnetization preventing member and in case of inserting the demagnetization preventing member into the permanent magnet according to FIG. 6, FIG. 11 is a graph for comparing the d-axis inductances in case of not inserting the demagnetization preventing member and in case of inserting the demagnetization preventing member into the permanent magnet according to FIG. 6, FIGS. 12A and 12B are graphs for showing magnetic flux density and back EMF in the case that a housing of the outer rotor of the spoke type permanent magnet motor according to one embodiment of the present invention is magnetic material, and FIGS. 13A and 13B are graphs for showing the magnetic flux density and the back EMF in the case that the housing of the outer rotor of the spoke type permanent magnet motor according to one embodiment of the present invention is non-magnetic material.

Referring to FIG. 2, the spoke type permanent magnet motor 100 according to one embodiment of the present invention may include an inner stator 110 provided at the circumference of an outer circumference surface of a rotation shaft (not shown), and an outer rotor 130, provided at the outer circumference surface thereof, enclosing the inner stator 110. Wherein, a rotation force of the outer rotor 130 is transferred into a rotation shaft, and the outer rotor 130 may be mechanically connected to the rotation shaft to transfer the rotation force.

The spoke type permanent magnet motor 100 according to one embodiment of the present invention may be applied to the motors including the inner stator and outer rotor and including the outer stator and inner rotor. That is, the spoke type permanent magnet motor 100 according to one embodiment of the present invention may form the rotor inside or outside the stator. Hereinafter, for the convenience of explanation, the motor disposing the rotor in the circumference of the stator is described as an example.

The inner stator 110 in the spoke type permanent magnet motor 100 according to one embodiment of the present invention may form an inserting hole 111 of the rotation shaft, for inserting the rotation shaft, at the center thereof, and may include a stator slot 113 radially disposed according to the center of the inserting hole 111 and a stator core 112 radially formed between the stator slots 113. A coil 114 is wound on the stator slot 113.

As shown in FIG. 2, the stator core 112 and stator slots 113 of the inner stator 110 are alternately disposed from each other, and may be radially provided along radial direction passing through the center of the inserting hole 111 of the rotation shaft. Wherein, the stator core 112 and stator slot 113 are radially disposed along the radial direction and therefore, the inner stator 110 may be formed in a spoke type.

On the other hand, the outer rotor 130 is provided to enclose the outside of the inner stator 110, that is, the circumference thereof, wherein the outer rotor 130 is provided at the circumference of the stator core 112 and the stator slot 113 of the inner stator 110 and may include a permanent magnet 140 radially disposed between the rotor cores 131 radially disposed in the same direction as the stator core 112 and the stator slot 113.

The rotor core 131 and permanent magnet 140 of the outer rotor 130 are radially formed along the radial direction of the outer rotor 130 and therefore, may be formed in the spoke type. That is, the spoke type permanent magnet motor 100 according to the present invention has one technical characteristic that the outer rotor 130 has the structure having the spoke type. Likewise, the outer rotor 130 is formed into the spoke type, thereby to maintain high output density or magnetic flux density, to reduce size of the whole motor and the amount of necessary magnet, and to maintain the same size and performance as the motor using rare-earth magnet.

Wherein, the stator core 112 of the inner stator 110 and the rotor core 131 of the outer rotor 130 may be formed so that free ends are faced to each other, and an air gap 142 may be formed between one end of the permanent magnet 140 between the rotor cores 131 and the stator core 112. Likewise, in order to form the air gap 142 between one end of the permanent magnet 140 and the stator core 112, it is desirable that the length of the permanent magnet 140 is shorter than it of the rotor core 131. That is, the length of the permanent magnet 140 toward the radial direction of the inserting hole 111 of the rotation shaft or the outer rotor 130 is shorter than it of the rotor core 131, and therefore, the air gap 142 may be formed between the permanent magnet 140 and stator core 112.

It may recognize that the permanent magnet 140 is magnetized in face to face direction. That is, referring to FIG. 2, magnetization directions 144 of the permanent magnet 140 may be formed in the face to face direction or in the direction to be spaced apart from each other. Likewise, magnetization directions 144 of the permanent magnet 140 may be formed to face each other, and therefore, the rotor core 131 between the permanent magnets 140 may have substantial polarities (that is, N pole and S pole).

FIG. 3 and FIG. 4 show a connecting structure between the rotor housing 150 and rotor core 131 in the outer rotor 130.

Referring to FIG. 3, the rotor core 131 and the permanent magnet 140 are alternately disposed from each other. Wherein, the permanent magnet 140 is pushed between the rotor cores 131, and may be radially disposed along the radial direction of the inserting hole 111 of the rotation shaft or the outer rotor 130. It is desirable that the interval between the rotor cores 131 is smaller than the width of the permanent magnet 140 so that the permanent magnet 140 is pushed between the rotor cores 131. The permanent magnet 140 is pushed in the height direction of the outer rotor 130 or may be pushed toward the inserting hole 137 of the stator of the outer rotor 130.

The permanent magnet 140 shown in FIG. 3 has approximately rectangle while the rotor core 131 has approximately trapezoid. On the contrary, the permanent magnet 140 may have approximately trapezoid while the rotor core 131 may have approximately rectangle. That is, the shapes of the permanent magnet 140 and rotor core 131 may be variously selected, and it is desirable that the permanent magnet 140 and rotor core 131 are formed as the same shape in respect of productivity.

On the other hand, the fixing scheme between the permanent magnet 140 and rotor core 131 is not limited to the pushing, and may fix them to each other using separable assistance structures. For example, a fixing ring (not shown) may be fastened at the top and bottom of the permanent magnet 140 and rotor core 131, and the inserting hole 137 of the stator may be disposed with a pushing ring (not shown) for pushing the permanent magnet 140 and rotor core 131 into the outside to fix the permanent magnet 140 and rotor core 131.

As shown in FIG. 3, the outer rotor 130 in the spoke type permanent magnet motor 100 according to one embodiment of the present invention may include the rotor housing 150 connected with one end of the rotor core 131. That is, the rotor core 131 of the outer rotor 130 may be formed with a division type core so that it may be detached from the rotor housing 150.

FIG. 4 shows a connecting structure between the rotor housing 150 and rotor core 131 in the outer rotor 130. Referring to FIG. 4, the rotor housing 150 is formed with cylindrical shape, and a coupling groove 151 may be formed at inner circumference surface of the rotor housing 150 being in contact with one end of the rotator core 131. A coupling projection 132 having the same shape may be formed to insert into the coupling groove 151 at one end of the rotator core 131 toward the inner circumference surface of the rotor housing 150. At this time, the inner circumference surface of the rotor housing 150 is formed with the coupling projection (not shown), and one end of the rotator core 131 is formed with the coupling groove (not shown).

Referring to FIG. 4, the coupling groove 151 and coupling projection 132 have approximately a rectangular shape, wherein they are not limited to this shape and various shapes such as a circle, an oval, etc. are possible. The fastening between the rotor housing 150 and the rotator core 131 uses a scheme that slides and pushes the rotator core 131 from the top or bottom of the rotor housing 150.

On the other hand, FIG. 5 shows variations for the connecting structure between the rotor housing 150 and rotor core 131 in the outer rotor 130. Referring to FIG. 5, a first fastening member 152, having a ring shape, is provided at the top or bottom thereof along the height direction of the outer rotor 130 so that the rotor housing 150 is in contact with the rotor core 131, and the first fastening member 152 at the top or bottom thereof may be stably fixed by a second fastening member 153 through the first fastening member 152 and rotor core 131. FIG. 5 shows a cross-sectional view for a portion of the first fastening member 152 and second fastening member 153 having the ring shape.

The second fastening member 153 should penetrate the permanent magnet 140 or rotor core 131 to tighten the first fastening member 152 at the top or bottom of the outer rotor, wherein, because the performance is lowered due to the reduction of the amount of the permanent magnet in case of penetrating the permanent magnet 140, it is desirable to penetrate the rotor core 131.

Wherein, it is desirable that the first fastening member 152 and second fastening member 153 are made of non-magnetic material. Further, the second fastening member 153 may connect the rotor housing 150 and rotor core 131 to each other by stably tightening the first fastening member 152 at the top and bottom thereof by a rivet fastening scheme. At this time, the first fastening member 152 and second fastening member 153 only may be used, and the connecting structure shown in FIG. 4 may be used together with the first and second fastening member 152 and 153 in some cases.

The first and second fastening member 152 and 153 in the motor 100 according to one embodiment of the present invention may support or fasten both ends of the rotor in the case that the rotor is disposed inside the stator. In this case, the rotor disposed inside the stator may be formed with a division type rotor core.

Further, the rotor housing 150 may be formed with the non-magnetic material to increase the back EMF and reduce the leakage of magnetic flux. At this time, the rotor housing 150 is made of the non-magnetic material, that is, reinforced plastics or stainless steel (SUS) so that rigidity of the rotor housing 150 may be adequately maintained. But, the reinforced plastics or stainless steel is an example for the non-magnetic material, and is not limited thereto.

Referring to FIGS. 12A and 12B and FIGS. 13A and 13B, the graph compares the magnetic flux density and back EMF for the cases for forming the rotor housing 150 with the magnetic material and the non-magnetic material.

First, FIGS. 12A and 12B are the graphs for showing the magnetic flux density and back EMF in case of forming the rotor housing 150 with the magnetic material. The linkage magnetic flux or magnetic flux density of the coil is thin in the right graph of FIG. 12A. Points, representing the size of the linkage magnetic flux or magnetic flux density, in coil section are thin, while Points near the rotor housing 150 are close and therefore are deeply displayed. Further, referring to FIG. 12B, the size of the back EMF has approximately values between −0.2V and +0.2V.

Next, FIGS. 13A and 13B are the graphs for showing the magnetic flux density and back EMS in case of forming the rotor housing 150 with the non-magnetic material, like the present invention. The linkage magnetic flux or magnetic flux density of the coil in the right graph of FIG. 13A is close as compared with FIG. 12A. Points, representing the size of the linkage magnetic flux or magnetic flux density, in coil section are close and therefore are deeply displayed, while points near the rotor housing 150 are thin and therefore are faintly displayed. Further, referring to FIG. 12B, the size of the back EMF has values between −30V and +30V. Therefore, in case of forming the rotor housing 150 with the non-magnetic material, the leakage of magnetic flux may be reduced and the back EMF may become large.

Referring to FIGS. 6A and 6B, the permanent magnet 140 is formed with the demagnetization preventing member 145. The demagnetization preventing member 145, that may reduce the generation of the demagnetization for the permanent magnet 140, may prevent the phenomenon easily generating the demagnetization of the permanent magnet 140, in case of the spoke type motor, as compared with different type motor. Wherein, the demagnetization means that it is changed from the magnetized state to the demagnetized state or some weakly magnetized degree.

The demagnetization preventing member 145 is integrally formed with the permanent magnet 140 or may be detached from the permanent magnet 140. For example, the demagnetization preventing member 145 may be integrally made with the permanent magnet 140 in a step for producing the permanent magnet 140, and the demagnetization preventing member 145 may be inserted into the permanent magnet by a post-processing after detachably producing the permanent magnet 140 only.

FIG. 6B shows the permanent magnet 140 forming an inserting groove 147 of the demagnetization preventing member for inserting the demagnetization preventing member 145 into the permanent magnet 140 by the post-processing. The inserting groove 147 of the demagnetization preventing member is processed in the permanent magnet 140, and the demagnetization preventing member 145 suitable for the inserting groove 147 of the demagnetization preventing member may be inserted in a pushing scheme. But, the connecting structure between the shown permanent magnet 140 and the demagnetization preventing member 145 is one example only, and may be variously changed according to design considerations.

Wherein, the demagnetization preventing member 145 may be made of the magnetic material so that it may be inserted or mounted into the permanent magnet 140. The demagnetization preventing member 145 made with the magnetic material is inserted or mounted into the permanent magnet 140, thereby to reduce the generation of irreversible demagnetization. Further, the d-axis inductance is increased by the demagnetization preventing member 145 such that weak field control may be easily performed.

The demagnetization preventing member 145 made with the magnetic material is inserted or mounted into the permanent magnet 140 configuring the outer rotor 130 in the spoke type permanent magnet motor 100 according to one embodiment of the present invention and therefore, coil magnetomotive force generated in the coil 113 of the inner stator 110 is not flowing through the permanent magnet 140 and is flowing through the demagnetization preventing member 145 such that it may prevent that the permanent magnet 140 is demagnetized by the coil magnetomotive force.

Referring to FIGS. 6A and 6B, the demagnetization preventing member 145 is shown to be positioned near the inner stator 110 or the stator core 112 rather than the rotor housing 150, but the demagnetization preventing member 145 may prevent the permanent magnet 140 from demagnetizing only if it is inserted into the permanent magnet 140 in the position near the inner stator 110 and without limiting disposing position.

Likewise, the demagnetization preventing member 145 blocks the flux or coil magnetomotive force flowing through the permanent magnet 140, thereby to form the flux or coil magnetomotive force by the demagnetization preventing member 145.

On the other hand, FIG. 7 is the graph for showing d-axis and q-axis inductance according to current angles of the outer rotor 130 in the spoke type permanent magnet motor 100 according to one embodiment of the present invention. Referring to FIG. 7, the q-axis inductance is larger than the d-axis inductance, wherein reluctance torque is caused due to the difference between the d-axis inductance and the q-axis inductance in the spoke type permanent magnet motor 100 according to one embodiment of the present invention.

Further, FIG. 8 to FIG. 10 show the graphs for comparing the amounts of linkage magnetic flux generated by the permanent magnet for the motor (refer to FIG. 8) not having the demagnetization preventing member made of the magnetic material and the motors (refer to FIG. 9 and FIG. 10) having it in the permanent magnet. Referring to FIG. 8, in case of the motor (refer to FIG. 8) not having the demagnetization preventing member, the difference in the amounts of the linkage magnetic flux generated by the permanent magnet before and after demagnetization analysis is present. That is, the graph in FIG. 8 shows that, on looking the linkage magnetic flux at angles of 1 degree to 3 degrees and 13 degrees to 16 degrees, a thin line meaning the linkage magnetic flux generated before demagnetization analysis does not coincident with a thick line meaning the linkage magnetic flux generated after demagnetization analysis. This means that the permanent magnet is demagnetized after demagnetization analysis.

On the contrary, the amount of the linkage magnetic flux is somewhat reduced in the motor (refer to FIG. 9), forming the demagnetization preventing member at approximately the center of the permanent magnet, of the motor having the demagnetization preventing member as compared with the motor not having the demagnetization preventing member, but the difference in the amounts of the linkage magnetic flux generated by the permanent magnet before and after demagnetization analysis is absent. That is, the thin line meaning the linkage magnetic flux generated before demagnetization analysis is coincident with the thick line meaning the linkage magnetic flux generated after demagnetization analysis. Likewise, the difference in the amounts of the linkage magnetic flux generated by the permanent magnet before and after demagnetization analysis is absent in the motor (refer to FIG. 10), forming the demagnetization preventing member near the housing, of the motor having the demagnetization preventing member.

In FIG. 9, the demagnetization preventing member 145 is formed in approximately the middle part of the permanent magnet 140, a thickness of the demagnetization preventing member 145 is 0.35 mm, a part of the permanent magnet 140 adjacent to both ends thereof is removed, air is to be present at the circumference of both ends of the demagnetization preventing member 145, and then it performs demagnetization analysis. Further, in FIG. 10, the demagnetization preventing member 145 is formed in the end of the permanent magnet 140 near the housing 150, the thickness of the demagnetization preventing member 145 is 0.35 mm, the part of the permanent magnet 140 adjacent to both ends thereof is removed, air is to be present at both ends of the demagnetization preventing member 145, and it performs demagnetization analysis. But, air is present at one side of the demagnetization preventing member 145, that is, between the demagnetization preventing member 145 and the permanent magnet 140 in FIG. 10 as compared with FIG. 9, while air is to be relatively small between the demagnetization preventing member 145 and the housing 150, and then it performs demagnetization analysis.

Likewise, demagnetization characteristics may be somewhat varied according to the positions, thicknesses and shapes of the demagnetization preventing member 145 and whether air is present near the demagnetization preventing member, but the difference in the linkage magnetic fluxes generated before demagnetization analysis and after demagnetization analysis is absent on comparing with the case having no the demagnetization preventing member.

FIG. 11 shows the graph for comparing the d-axis inductances of the motor (non-magnetic material in PM) not inserting the demagnetization preventing member into the permanent magnet and the motor (magnetic material in PM) inserting the demagnetization preventing member into the permanent magnet. Referring to FIG. 11, the case inserting the demagnetization preventing member into the permanent magnet has the d-axis inductance larger than the case not inserting it.

Therefore, the inner stator 110 and outer rotor 130 are formed in the spoke type, the rotor housing 150 is made of the non-magnetic material, the demagnetization preventing member 145 made of the magnetic material is inserted into the permanent magnet 140 in the spoke type permanent magnet motor 100 according to one embodiment of the present invention, thereby to maintain the same size and performance as the motor using the rare-earth permanent magnet even on making the permanent magnet 140 with ferrite series.

Hereinafter, the spoke type permanent magnet motor 200 according to another embodiment of the present invention will be described with reference to the drawings.

Figure 14:
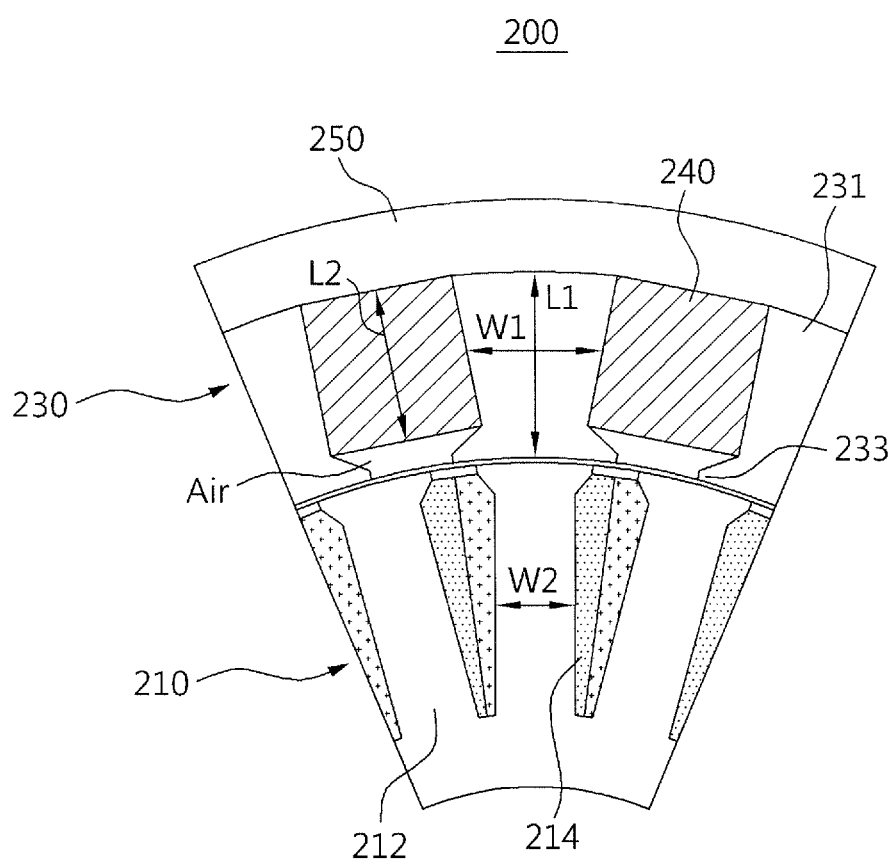
FIG. 14 is a view for showing a portion of the spoke type permanent magnet motor according to another embodiment of the present invention.
Figure 15A:
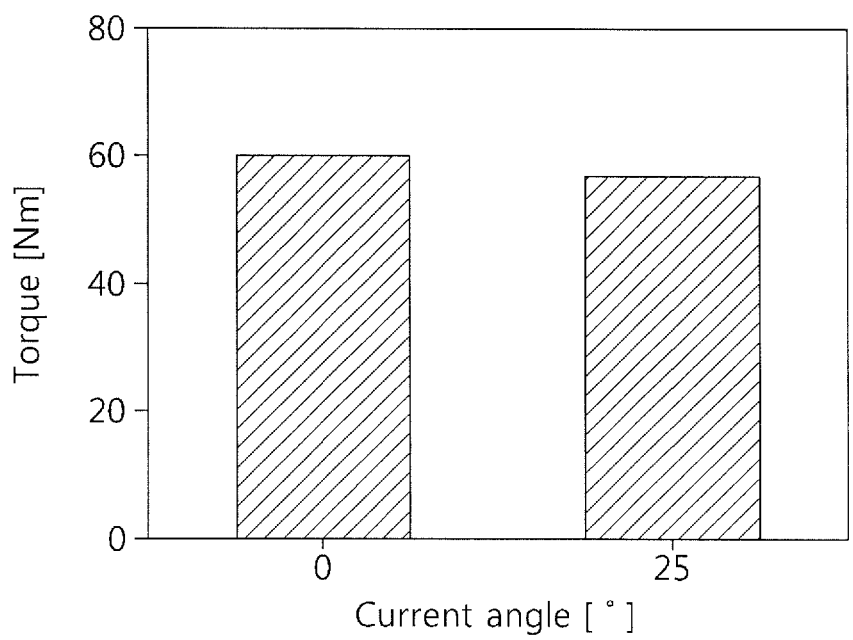
FIGS. 15A and 15B are graphs for comparing current angles and torque in the motor, in which the length of the rotor core is the same as it of the permanent magnet, and in the spoke type permanent magnet motor shown in FIG. 14.
Figure 15B:
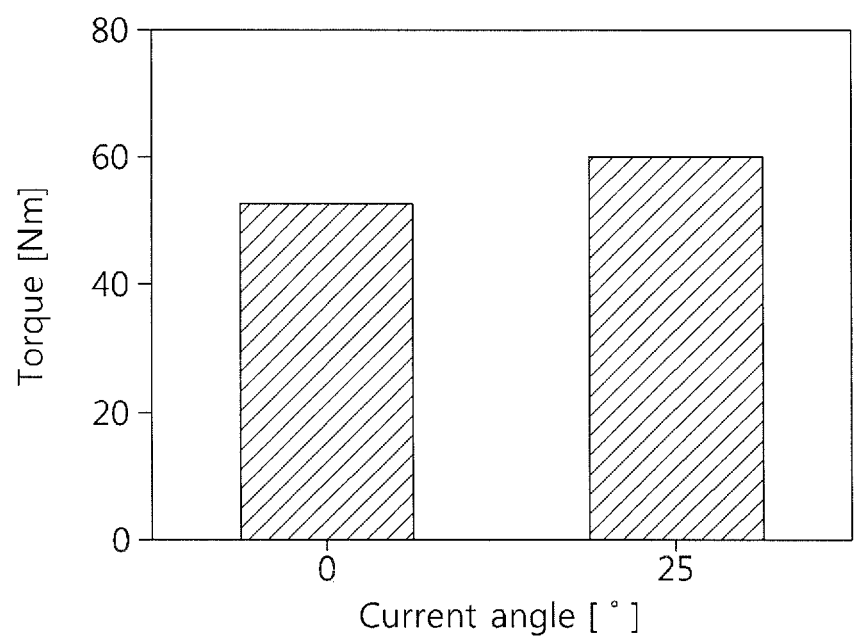
Figure 16:
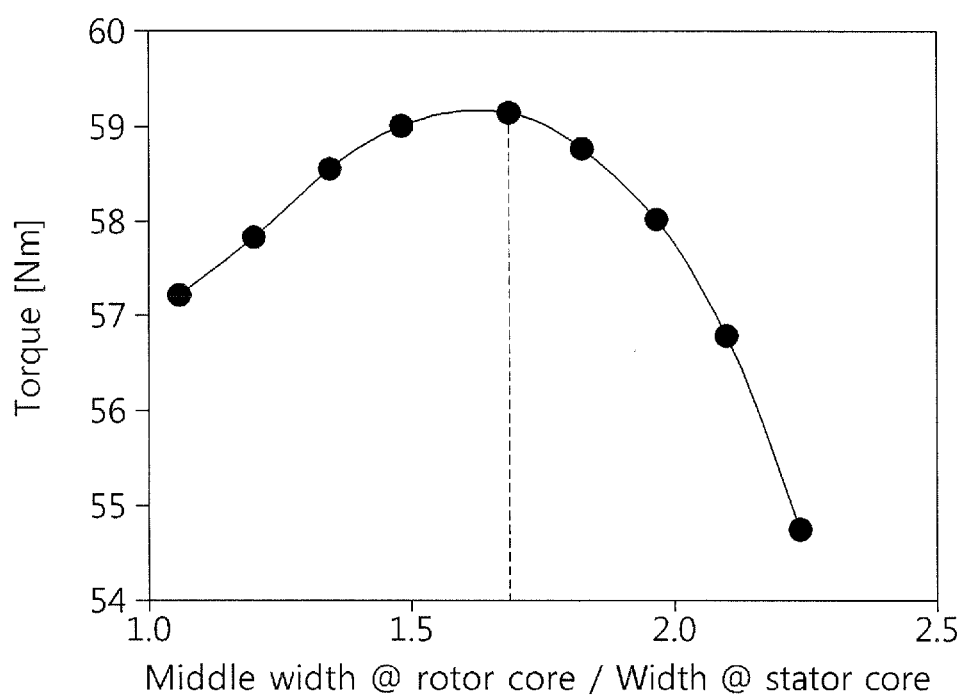
FIG. 16 is a graph for showing changing of the amount of the torque produced by the ratio of the width of a middle part of a rotor core to the width of the middle part of a stator core in the spoke type permanent magnet motor according to FIG. 14.

FIG. 14 is a view for showing a portion of the spoke type permanent magnet motor according to another embodiment of the present invention, FIGS. 15A and 15B are graphs for comparing the current angles and torques in the motor, in which a length of the rotor core is the same as it of the permanent magnet, and in the spoke type permanent magnet motor shown in FIG. 14, and FIG. 16 is a graph for showing changing of the amounts of the torques produced by the ratio of the width of the middle part of a rotor core to the width of middle part of a stator core in the spoke type permanent magnet motor according to FIG. 14.

The spoke type permanent magnet motor 200 according to another embodiment of the present invention below has the same configurations, on the exception that the lengths of the rotor core and permanent magnet and the shapes of the rotor core and stator core are different, as compared with the spoke type permanent magnet motor 100 according to one embodiment of the present invention described in FIG. 2 above. Hereinafter, the following description is described about parts only different from the spoke type permanent magnet motor 100 shown in FIG. 2, and the same parts as the spoke type permanent magnet motor 100 shown in FIG. 2 are described using the same reference numerals.

As shown in FIG. 14, the spoke type permanent magnet motor 200 according to another embodiment of the present invention includes the inserting hole 111 of the rotation axis inserted with the rotation shaft (not shown), and includes the stator slot 113 radially disposed according to the center of the inserting hole 111, an inner stator 210 disposed with a stator core 212 radially formed between the stator slots 113, a rotor core 231 provided at the circumference of the inner stator 210 and radially disposed in the same direction as the stator slot 113 and the stator core 212, and a spoke type outer rotor 230 radially disposed between the rotor cores 231 and included with the permanent magnet 240 shorter than the rotor core 231. The stator slot 113 may be wound with the stator coil 214.

Referring to FIG. 14, the spoke type permanent magnet motor 200 according to another embodiment of the present invention, in common with the motor 100 shown in FIG. 2, is an external rotor type rotor in which the stator is formed inside thereof and the rotor is formed outside it, all the rotor core 231, the stator core 212 and the permanent magnet 240 have constant lengths along the radial direction of the motor 200, and are formed with the spoke type radially disposed along the circumferential direction of the motor 200. Likewise, the rotor core 231, the stator core 212 and the permanent magnet 240 are formed in the spoke type, thereby to concentrate the flux and to maintain the performance even on reducing the amount of the permanent magnet.

The outer rotor 230 in the spoke type permanent magnet motor 200 according to another embodiment of the present invention may include a housing 250, having a cylindrical shape, formed at the outermost section, and a division type rotor core 231 detachably formed from the housing 250. That is, one end of the rotor core 231 may be connected to the housing 250. Wherein, the housing 250 may be formed with the non-magnetic material, and the fastening structure or scheme between the housing 250 and rotor core 231 is the same as it of the motor 100 shown in FIG. 2.

On the other hand, the type of the rotor core 231 is different from it of the motor 100 shown in FIG. 2. As shown in FIG. 14, the length L1 of the rotor core 231 may become shorter than the length L2 of the permanent magnet 240. That is, the interval between the rotor core 231 and the inner stator 210 may be shorter than it between the permanent magnet 240 and inner stator 210 in the state in which the rotor core 231 and permanent magnet 240 are fastened or adhered to the housing 250. Therefore, larger air gap may be formed between the permanent magnet 240 and inner stator 210.

Wherein, one end 233 of the rotor core 231 adjacent to the inner stator 210 may be protruded in the width direction of the permanent magnet 240. That is, one end of the widthwise corner section 233 at the inner stator 210 side of the rotor core 231 may be protruded toward the permanent magnet 240. Likewise, one end of the rotor core 231 or the corner section 233 at the inner stator 210 side may be protruded toward the permanent magnet 240, and therefore, the rotor core 231 may stably maintain the coupling or pushing state for the permanent magnet 240 and a magnetic flux flowing path between the stator core 212 and rotor core 231 may be easily formed.

As described above, the length of the rotor core 231 is formed longer than it of the permanent magnet 240, and therefore the inner circumference surface of the outer rotor 230 facing the inner stator 210 may be formed in a non-curved surface type. For our better understanding, when the lengths of the rotor core and the permanent magnet are approximately the same, the inner circumference surface of the outer rotor facing the inner stator may be formed in an approximately curved surface type.

The length of the rotor core 231 is formed longer than it of the permanent magnet 240 and the inner circumference surface of the outer rotor 230 may be formed in the non-curved surface type, in the spoke type permanent magnet motor 200 according to another embodiment of the present invention, and therefore, magnetic torques and reluctance torques may be generated, thereby to maximally reduce the amount of the permanent magnet and to increase output density. That is, the inner circumference surface of the outer rotor 230 may be formed in the non-curved surface type and therefore, the magnetic torques and reluctance torques may be generated, thereby to acquire the same torque even on using less and less permanent magnet.

FIG. 15A shows the current angles (transverse axis) and output torques (longitudinal axis) for the motor using a curved-surface type outer motor having the permanent magnet and the rotor core having the same lengths. Referring to FIG. 15A, when the current angle is 0 degree, the torque (magnetic torque) of approximately 60 Nm is generated, but when the current angle is 25 degrees, the torque smaller than 60 Nm is generated. Therefore, the curved type outer rotor permanent magnet motor may use the magnetic torques only generated when the current angle is 0 degree, the torques are decreased when the current angle generates, and therefore the reluctance torques may not be used.

On the contrary, as shown in FIG. 15B, when the current angle is 0 degree, the magnetic torque is approximately 50 Nm, but when the current angle is 25 degrees, the output torque become about 60 Nm, in the non-curved surface type of the spoke type permanent magnet motor 200 according to another embodiment of the present invention. That is, the torque is increased in case of generating the current angles, wherein this is because the whole output torque adding the generated reluctance torque to the magnetic torque is increased.

Therefore, since the spoke type permanent magnet motor 200 according to another embodiment of the present invention may generate the reluctance torque in spite of reduction of the amount of the permanent magnet at the same size as the curved-surface type of the outer rotor permanent magnet motor, it may acquire approximately the same torques as the curved-surface type of the outer rotor permanent magnet motor. That is, when the lengths of the rotor cores are the same, the length of the permanent magnet 240 of the spoke type permanent magnet motor 200 according to another embodiment of the present invention is shorter than the length of the curved type of the permanent magnet and therefore, the amount of the permanent magnet used in the rotor 200 according to another embodiment of the present invention may be smaller than it of the curved surface type of the motor. However, it is possible to maintain the same output even on using a small quantity of permanent magnet. Referring to FIG. 15, the torques having the current angles of 20 degrees in the spoke type permanent magnet motor 200 according to another embodiment of the present invention having the non-curved surface type of the outer rotor 230 may be approximately the same torque as the magnetic torques having the current angles of 0 degrees in the curved surface type motor in spite of the reduction of the amount of the permanent magnet.

When the permanent magnets having the same amount are used, the spoke type permanent magnet motor 200 according to another embodiment of the present invention may acquire the output much larger than the curved surface type motor.

On the other hand, referring to FIG. 14, the width W1 of the rotor core 231 is larger than the width W2 of the stator core 212 in the spoke type permanent magnet motor 200 according to another embodiment of the present invention. On describing in detail, it is desirable that the width W1 of the middle part of the rotor core 231 is larger than the width W2 of the middle part of the stator core 212. Likewise, the width W1 of the middle part of the rotor core 231 is larger than the width W2 of the middle part of the stator core 212, thereby to increase the output torque.

FIG. 16 shows torques changed according to changing of the ratio the width W1 of the middle part of the rotor core 231 to the width W2 of the middle part of the stator core 212. FIG. 16 shows that there are relatively large torques in the case that the ratio of the width W1 of the middle part of the rotor core 231 to the width W2 of the middle part of the stator core 212 is 1.5 to 2. That is, there are torques larger than 57.5 Nm when the ratio of the width W1 of the middle part of the rotor core 231 to the width W2 of the middle part of the stator core 212 is 1.5 to 2.

Wherein, there are maximum torque when the ratio of the width W1 of the middle part of the rotor core 231 to the width W2 of the middle part of the stator core 212 is 1.69 (refer to dot lines in FIG. 16). There is the ratio of the rotor core 231 and the stator core 212 for generating the maximum torque in the spoke type permanent magnet motor 200 according to another embodiment of the present invention or the motor having the similar structure as it, and therefore such an optimal ratio is selected to acquire the maximum torque.

Further, the spoke type permanent magnet motor 200 according to another embodiment of the present invention has the same fastening structure as the motor 100 shown in FIG. 2 for the fastening between the housing 250 and rotor core 231. That is, the housing 250 may be coupled with the rotor core 231 by the first fastening member 152, made of the non-magnetic material, provided at the top and bottom thereof, respectively, along the height direction of the outer rotor 230 and the second fastening member 153, made of the non-magnetic material, provided to penetrate the rotor core 231 and the first second fastening member 152. Wherein, the first and second fastening member 152 and 153 are the same as those of the motor shown in FIG. 2 and therefore, the repetitive description is omitted.

In addition, the permanent magnet 240 of the spoke type permanent magnet motor 200 according to another embodiment of the present invention may also include the demagnetization preventing member 145. The shapes, positions and effects, etc. of the demagnetization preventing member 145 are the same as those of the motor 100 shown in FIG. 2 and therefore, the repetitive description is omitted.

As described above, the spoke type permanent magnet motor according to the present invention uses the inner stator and the spoke type outer rotor to maintain high output density.

The spoke type permanent magnet motor according to the present invention may achieve the miniaturization of the motor and use the permanent magnet of inexpensive ferrite series, thereby to reduce manufacturing cost.

The spoke type permanent magnet motor according to the present invention inserts the magnetic material into the permanent magnet, thereby to reduce the generating of irreversible demagnetization for the permanent magnet and to facilitate weak field control.

A housing of the outer rotor in the spoke type permanent magnet motor according to the present invention is made of the non-magnetic material, thereby to increase back EMF and to minimize leakage of magnetic flux.

The spoke type permanent magnet motor according to the present invention generates reluctance torque, thereby to generate the same output torque in spite of the reduction of the amount of the permanent magnet.

The spoke type permanent magnet motor according to the present invention optimizes the ratio of the widths of the rotor core and the stator core, thereby to acquire maximum torque.

As described above, although the present invention is described by specific matters such as concrete components and the like, exemplary embodiments, and drawings, they are provided only for assisting in the entire understanding of the present invention. Therefore, the present invention is not limited to the exemplary embodiments. Various modifications and changes may be made by those skilled in the art to which the present invention pertains from this description. Therefore, the spirit of the present invention should not be limited to the above-described exemplary embodiments and the following claims as well as all modified equally or equivalently to the claims are intended to fall within the scopes and spirit of the invention.

The present invention may be applied to traction motors or compressors, blowers, driving motor for pump, etc. of means of transportation such as railroad, automobile, ship, etc.

The present invention may be used for motors for towing transportation means including trains, vehicles, ships, and compressor, blowers, pump driving motors.

What is claimed is:

1. A spoke type permanent magnet motor, comprising:
    an inner stator having a stator slot radially disposed according to the center thereof and a stator core radially formed between the stator slots;
    an outer rotor, having spoke type and provided outside the inner stator, having a rotor core radially disposed in the same direction as the stator slot and stator core and a permanent magnet radially disposed between the rotor cores;
    a first fastening member, having a ring shape and made of non-magnetic material, provided at the top and bottom of the outer rotor, respectively, in the height direction of the outer rotor;
    a second fastening member, made of non-magnetic material, provided to penetrate the rotor core and first fastening member; and
    a demagnetization preventing member integrally formed with the permanent magnet or detachably formed from the permanent magnet,
    wherein the demagnetization preventing member is made of magnetic material inserted into the permanent magnet, and a coil magnetomotive force generated in a coil of the inner stator is not flowing through the permanent magnet and is flowing through the demagnetization preventing member such that the demagnetization preventing member prevents the permanent magnet from being demagnetized by the coil magnetomotive force.

2. The spoke type permanent magnet motor according to claim 1, wherein the permanent magnet is magnetized in the direction facing each other.

3. The spoke type permanent magnet motor according to claim 1, wherein the outer rotor comprises a rotor housing formed with a cylindrical shape and provided at an outer surface of the rotor,
    and one end of the rotor core is connected to the rotor housing at inner circumferential surface of the rotor housing.

4. The spoke type permanent magnet motor according to claim 3, wherein one end of the rotor core is formed with projections or grooves for connecting to the housing, and
    the housing connected with one end of the rotor core is formed with the grooves or projections corresponding to the grooves or projections of the rotor core.

5. The spoke type permanent magnet motor according to claim 4, wherein the permanent magnet is pushed between the rotor cores, and is radially disposed along the radial direction of the inserting hole.

6. The spoke type permanent magnet motor according to claim 3, wherein the length of the permanent magnet for the radial direction of the inserting hole is shorter than it of the rotor core.

7. A spoke type permanent magnet motor, comprising:
    an inner stator having a stator slot radially disposed according to the center thereof and a stator core radially formed between the stator slots;
    an outer rotor, having spoke type and provided outside the inner stator, having a rotor core radially disposed in the same direction as the stator slot and stator core and a permanent magnet radially disposed between the rotor cores and formed shorter than the rotor core; and
    a demagnetization preventing member integrally formed with the permanent magnet or detachably formed from the permanent magnet,
    wherein the demagnetization preventing member is made of magnetic material inserted into the permanent magnet, and a coil magnetomotive force generated in a coil of the inner stator is not flowing through the permanent magnet and is flowing through the demagnetization preventing member such that the demagnetization preventing member prevents the permanent magnet from being demagnetized by the coil magnetomotive force.

8. The spoke type permanent magnet motor according to claim 7, wherein an interval between the rotor core and stator is shorter than it between the permanent magnet and the stator.

9. The spoke type permanent magnet motor according to claim 8, wherein one end of the rotor core adjacent to the stator is protruded in the width direction of the permanent magnet.

10. The spoke type permanent magnet motor according to claim 8, wherein the width of the middle part of the rotor core is larger than it of the middle part of the stator core.

11. The spoke type permanent magnet motor according to claim 10, wherein the ratio of the width of the middle part of the rotor core to the width of the middle part of the stator core is 1.5 to 2.

12. The spoke type permanent magnet motor according to claim 8, further comprising a rotor housing formed in the rotor and connected with one end of the rotor core,
    wherein the rotor housing is formed with a cylindrical shape and provided at an outer surface of the rotor,
    and one end of the rotor core is connected to the rotor housing at inner circumferential surface of the rotor housing.

13. The spoke type permanent magnet motor according to claim 12, wherein the rotor housing may be coupled with the rotor core by a first fastening member, made of the non-magnetic material, provided at the top and bottom thereof, respectively, along the height direction of the rotor and a second fastening member, made of the non-magnetic material, provided to penetrate the rotor core and the first fastening member.

14. The spoke type permanent magnet motor according to claim 12, wherein the demagnetization preventing member blocks flux flowing through the permanent magnet, and the flux is formed through the demagnetization preventing member.

15. The spoke type permanent magnet motor according to claim 12, wherein the housing is made of the non-magnetic material.

16. The spoke type permanent magnet motor according to claim 12, wherein the permanent magnet is ferrite series.

* * * * *